United States Patent [19]

Newbold et al.

[11] Patent Number: 5,576,955
[45] Date of Patent: Nov. 19, 1996

[54] METHOD AND APPARATUS FOR PROOFREADING IN A COMPUTER SYSTEM

[75] Inventors: Brett Newbold, Redwood Shores; Paul Dixon, San Francisco; Larry Stevens, Los Altos, all of Calif.

[73] Assignee: Oracle Corporation, Redwood Shores, Calif.

[21] Appl. No.: 480,933

[22] Filed: Jun. 7, 1995

Related U.S. Application Data

[63] Continuation of Ser. No. 44,821, Apr. 8, 1993, abandoned.
[51] Int. Cl.[6] .............................. G06F 3/14; G06F 17/21; G06F 17/24; G09B 5/00
[52] U.S. Cl. ..................... 395/795; 395/803; 395/792; 395/340
[58] Field of Search ........................... 364/419.1, 419.11, 364/419.12, 419.14, 419.17; 395/144, 145, 146, 155, 156, 157, 161

[56] References Cited

U.S. PATENT DOCUMENTS

| 4,136,395 | 1/1979 | Kolpek et al. . |
| 4,674,065 | 6/1987 | Lange et al. . |
| 4,783,758 | 11/1988 | Kucera . |
| 4,903,206 | 2/1990 | Itoh et al. . |

OTHER PUBLICATIONS

Carroll; "Four Routes to Better Writing"; *Lotus*; v5n7 p. 130(3); Jul. 1989 (DIALOG: file 256, 00008839).
POWEREDIT; version: 2.1; date released; 1992; Oracle Corp.; (Dialog: file 237, 00015980).
Alexander; "Editorial Tools for Better Writing"; *The Seybold Report on Publishing Systems*; pp. 10–3 to 10–18.

*Primary Examiner*—Donald McElheny, Jr.
*Assistant Examiner*—Stephen R. Tkacs
*Attorney, Agent, or Firm*—Fliesler, Dubb, Meyer & Lovejoy

[57] ABSTRACT

The present invention is a method and apparatus for processing errors in a computer system. The present invention scans information, generates an error unit for each error detected, provides an intuitive interface for communication of errors, and facilitates correction of errors. A data processing computer system of the present invention provides a proofreading capability for addressing errors such as spelling, grammar, usage, punctuation, broken words, doubled words, and capitalization. An error unit is created for each error detected during the proofreading scan of a document. An error unit uniquely identifies each error detected. Further, an error unit retains other information about an error including the error type, location, length, and correction status. The error unit is used to create a list of errors, or Error List. The Error List provides the ability to view errors in one location, and facilitates the error correction and proofreading process. Errors can be addressed in any order. When an error is selected from the Error List, the tight integration between the error and the scanned document provides the ability to locate and highlight the error within the scanned document. A Proofreading Screen provides additional information and proofreading functions. The error selections, and/or all occurrences of an error selection, can be corrected, ignored, learned, or autocorrected. The present invention provides the ability to group errors. Thus, a more intuitive interface is provided to facilitate the proofreading exercise. Further, operator interaction is minimized and simplified.

12 Claims, 19 Drawing Sheets

Text Window

We |all agree| that we make mistakes .
Never the less not as amny as youll
see here.How many can you find?

In the majority of cases OC does
suchan amazing job of of cor recting
your text/documents that there—after
you can focus on content — not
mechanics.

Your coworkers should be sure and
have readed the section on writing
behaviour.

FIG. 5A

Text Window

We agree that we make mistakes .
Never the less not as amny as youll
see here.How many can you find?

In the majority of cases OC does
suchan amazing job of of cor recting
your text/documents that
there—after you can focus on content
—not mechanics.

Your coworkers should be sure and
have readed the section on writing
behaviour.

FIG. 6A-1

| Text Window |

We agree that we make mistakes .
Never the less not as amny as youll
see here.How many can you find?

In the majority of cases OC does
suchan amazing job of of cor recting
your text/documents that
there-after you can focus on content
-not mechanics.

Your coworkers should be sure and
have readed the section on writing
behaviour.

*FIG. 6B-1*

Text Window

We agree that we make mistakes .
Never the less not as amny as youll
see here.How many can you find?

In the majority of cases OC does
suchan amazing job of of cor recting
your text/documents that
there-after you can focus on content
-not mechanics.

Your coworkers should be sure and
have readed the section on writing
behaviour.

FIG. 6C-1

Text Window

We agree that we make ⬚mistakes .⬚
Never the less not as amny as youll
see here.How many can you find?

In the majority of cases OC does
suchan amazing job of of cor recting
your text/documents that
there—after you can focus on content
—not mechanics.

Your coworkers should be sure and
have readed the section on writing
behaviour.

*FIG. 7A-1*

Text Window

We agree that we make mistakes .
Never the less. not as amny as youll
see here.How many can you find?

In the majority of cases OC does
suchan amazing job of of $\boxed{\text{cor recting}}$
your text/documents that
there—after you can focus on content
—not mechanics.

Your coworkers should be sure and
have readed the section on writing
behaviour.

*FIG. 7B-1*

Text Window

We |all agree| that we make mistakes.
Never the less not as amny as youll
see here.How many can you find?

In the majority of cases OC does
suchan amazing job of of cor recting
your text/documents that
there-after you can focus on content
-not mechanics.

Your coworkers should be sure and
have readed the section on writing
behaviour.

*FIG. 8A*

METHOD AND APPARATUS FOR PROOFREADING IN A COMPUTER SYSTEM

This application is a Continuation of Ser. No. 08/044,821, filed Apr. 8, 1993, now abandoned.

BACKGROUND OF THE INVENTION

1. Field of the Invention

This invention relates to the field of errors handling in a data processing environment.

2. Background Art

Text editors (e.g., word processing application) provide the ability to manipulate text. Many text editors provide some proofreading capability. In most text editors, this capability consists of a spelling checker for identifying spelling errors. Other examples, include tools for detecting grammatical and punctuation errors. Proofreading processing consists of error detection, communication, and correction.

For example, a spelling checker scans text to identify errors, communicates the errors, and provides an ability to correct the error. To identify the errors to a user, a spelling checker compares each word of the document with a spelling dictionary (i.e., dictionary of words). Spelling errors are detected when a word contained in the text does not exist in the spelling dictionary. If a word in the textual document is contained in the dictionary, the word is considered to be spelled correctly. If the word is not located in the dictionary, the word is considered to be spelled incorrectly (an "error"). The error is communicated to the user, and the user indicates how the error is to be corrected.

In prior art systems, the process of error detection, communication, and correction is implemented as a single phased approach, or as a multi-phased approach. A single phased approach combines error detection, communication, and correction into a single pass through the text. That is, text is scanned until an error is detected or all of the text has been scanned. If an error is detected, scanning is interrupted, the error is displayed, the user inputs the error correction. Until the user provides error-handling input, the scanning process remains dormant.

The single-phased approach displays the errors sequentially (i.e., in the order in which they were found). Individual errors are communicated as highlighted portions of the text (e.g., in boldface), or in some portion of the screen. Therefore, errors must be processed in the order in which they are found. Further, each error is corrected as it is encountered. Unless a global correction is requested to correct each occurrence of the error as it is encountered, each error is corrected individually.

The single-phased approach requires an excessive amount of user interaction for at least two reasons. First, the user is forced to monitor the error detection process even though error detection does not require any user input. Further, the error communication and correction capabilities provided in the single phase approach does not provide the ability to view the errors as a list (with or without a suggested alternative), to group a subset of the errors, and to perform error correction collectively on the group of errors.

The multi-phased approach scans all of the text before any errors are communicated. This approach eliminates the need to monitor the error detection process. However, like the single-phased approach, errors are communicated and corrected sequentially. There is no ability to view errors as a list, to group errors, and to perform proofreading functions collectively on the group of errors.

SUMMARY OF THE INVENTION

The present invention is a method and apparatus for processing errors in a computer system. The present invention scans a document, generates an error unit for each error detected, provides an intuitive interface for communication of errors, and facilitates correction of errors.

An example of a text processing computer system is a system executing word processing software. A word processing system with proofreading capabilities scans a word processing document, detects errors, communicates errors, and addresses the errors. Correction functionality includes correcting the error, ignoring the error, or adding the error to the proofreading dictionary. A data processing computer system of the present invention provides error detection such as spelling, grammar, usage, punctuation, broken words, doubled words, and capitalization.

An error unit is created for each error detected during a proofreading scan of a document. An error unit uniquely identifies each error detected. Further, an error unit retains other information about an error including the error type, location within the scanned document, length, and correction status.

The error unit is used to create a list of the errors detected during a scan. An error list provides the ability to view errors in one location, and facilitates the error correction and proofreading process. Errors can be addressed in any order. Errors are tightly integrated with the scanned data such that each error can be immediately located within the scanned data. When an error is selected from the error list, the error is located and highlighted in the scanned data.

Further, a proofreading screen provides informational messages about the error selection and possible correction suggestions. Proofreading functions are available in the proofreading screen. For example, the error selection can be corrected, ignored, learned (i.e., added to the proofreading dictionary), or autocorrected. An auto correction feature provides the ability to automatically correct an error. All occurrences of the error selection can be corrected using a "correct all" function.

The present invention provides the ability to group errors. Multiple scans of an error list can be performed prior to the invocation of a proofreading function to identify an error group. For example, errors may be grouped according to the proofreading function to be performed. Thus, one proofreading command can be used to address a group of different errors. Therefore, a more intuitive interface is provided to facilitate the error communication and correction steps in a proofreading exercise. Further, operator interaction is minimized and simplified.

DETAILED DESCRIPTION OF THE INVENTION

A method and apparatus for handling errors in a data processing environment. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
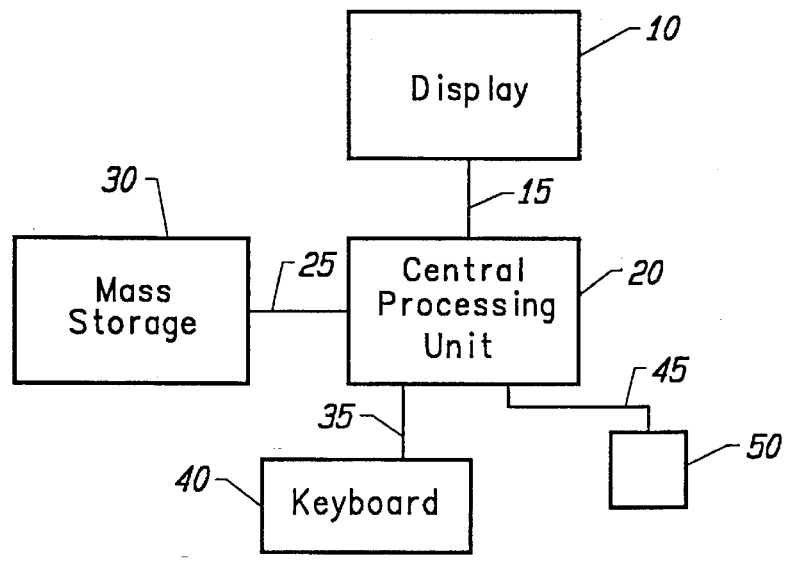
FIG. 1 illustrates a computer system of the present invention.

In the preferred embodiment, the present invention is implemented on multiple platforms that support graphical user interfaces such as MOTIF, operating systems such as "MICROSOFT WINDOWS" and computer systems such as MACINTOSH and character-mode terminals. A block diagram of a computer system for implementing the present invention is illustrated in FIG. 1. The computer system includes a Central Processing Unit (CPU) 20 coupled to an input/output device, such as keyboard 40 on line 35. Display 10 is coupled to CPU 20 through line 15. A position translating device, such as mouse 50, is coupled to CPU on line 45. Mouse 50 is used to move a position indicator, such as a cursor, on Display 10. The computer system of FIG. 1 also has associated Mass Storage 30 coupled to CPU through line 25.

Figure 2:
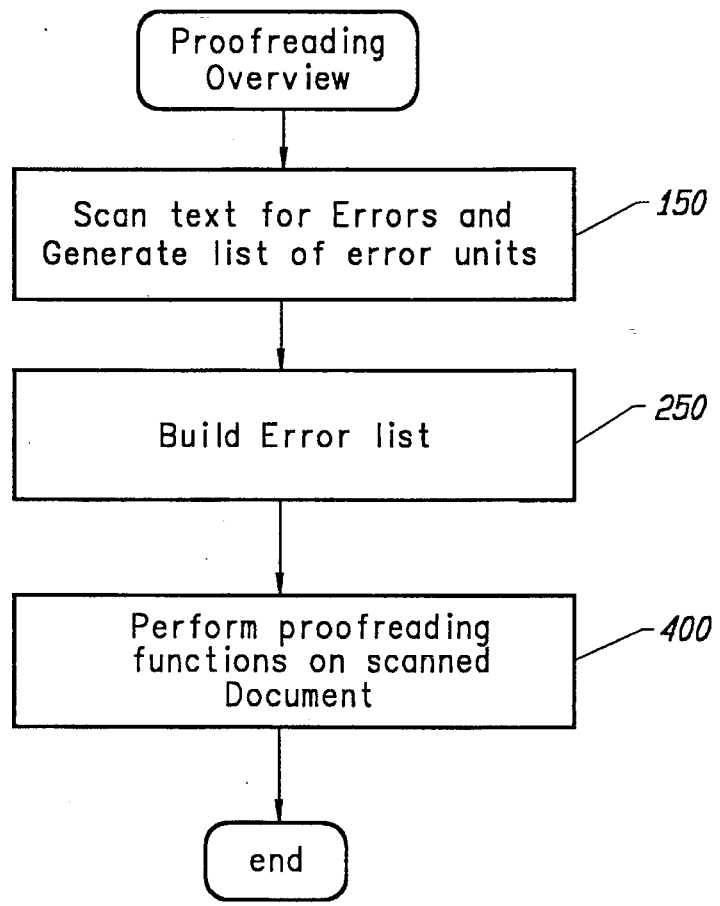
FIG. 2 illustrates a processing overview of the present invention.

The proofreading capability of the present invention consists of error detection, error communication, and error correction. The error detection phase generates an error unit for each error encountered in a document scanned during error detection. Error units are used to create a list of errors for review and correction. FIG. 2 provides an overview of the error detection, communication, and correction processes of the present invention.

At block 150, a textual document is scanned for errors and an error unit is generated for each detected error. While the present invention is illustrated using textual data, it should be noted that the present invention is applicable to other types of data such as graphic data. An error list is generated at processing block 250. An error list provides an intuitive means for viewing errors and addressing errors individually and in groups. An error list can be used in the Perform Proofreading functions exercise of block 400.

Error Units

The present invention uses a proofreading engine to scan text for errors. When an error is detected, an error unit is generated. An error unit contains information about a detected error. In the preferred embodiment, an error unit contains:

| | |
|---|---|
| error location | thirty-two bits |
| error length | sixteen bits |
| error identifier | thirty-two bits |
| correction status | sixteen bits |
| original error pointer | |
| undo stamp | |

The error location is an offset from beginning of the proofread text. The correction status indicates whether or not the error has been corrected, learned, ignored, auto-corrected, disabled, or corrupted. The undo stamp is used in when an undo operation is performed. The error identifier consists of multiple fields including a unique error identifier and an error type.

The types of errors detected are dependent on the proofreading engine used to scan the text. Possible error types are: spelling, usage, custom usage, punctuation, broken words, doubled words, capitalization, and spacing. The present invention has the capability to address any type of error. The present invention identifies errors as mechanical or non-mechanical errors. A mechanical error is an error that is context-sensitive, and is best understood by viewing the error in the text in which it occurred. Examples of mechanical errors are punctuation, broken words, doubled words, capitalization, and spacing. Non-mechanical errors can usually be communicated without viewing the error in its context. Examples of non-mechanical errors are spelling and usage.

Error List

Once the text has been scanned for errors, the present invention builds a list of the detected errors at 150 in FIG. 2. The Error List is used to communicate errors (either mechanical or non-mechanical errors) to the user in a more intuitive manner than prior art systems. The Error List provides the ability to communicate the errors outside of the context of the original text. This results in a greater number of errors being displayed on the screen, and provides the ability to scan the errors to determine the manner in which to approach the correction of the errors.

Further, errors can be implicitly ignored. That is, an Ignore operation is not needed to skip an error not requiring any action. An Error can be ignored by not selecting the error in the Error List. With the Error List, it is no longer necessary to correct errors in the order in which they are encountered. Errors can be corrected in any desired order. Further, the Error List provides the ability to select errors to be grouped, and to perform a proofreading function on the grouped errors.

Figure 5B:
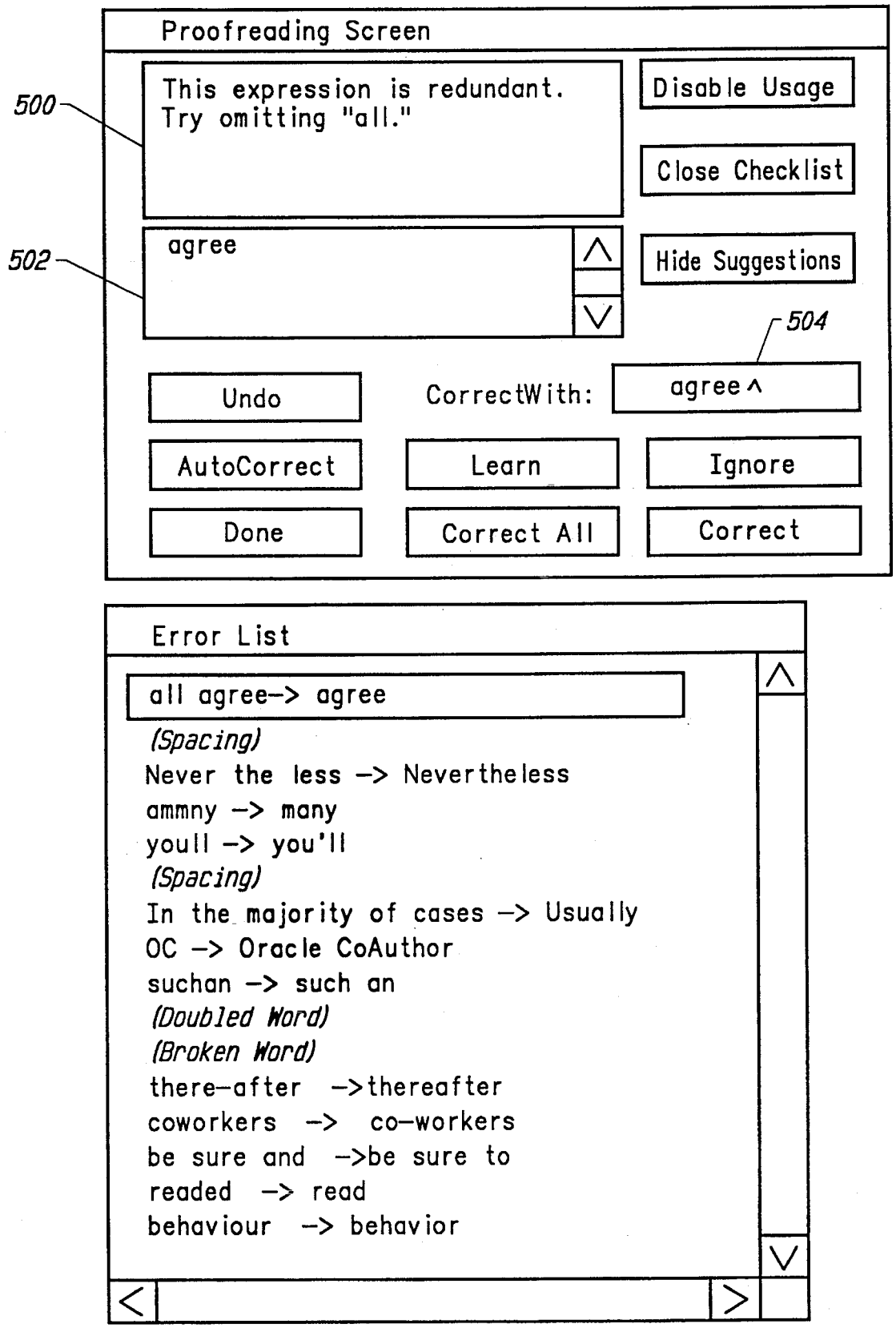
FIGS. 5 (5A and 5B) illustrates an initial proofreading display with ErrorList.

FIG. 5 illustrates an Error List with suggested alternatives. A user may wish to address a subset of errors first and then address the remaining errors individually or as a group. For example, the user could quickly scan the Error List selecting errors with acceptable correction suggestions. The user could request the correction of these errors as a group. Once the errors are corrected, they are eliminated from the Error List. This process provides the ability to correct errors by skipping over errors and choosing errors in an order other than the order that they were encountered or where they appear in the text.

Figure 8B:
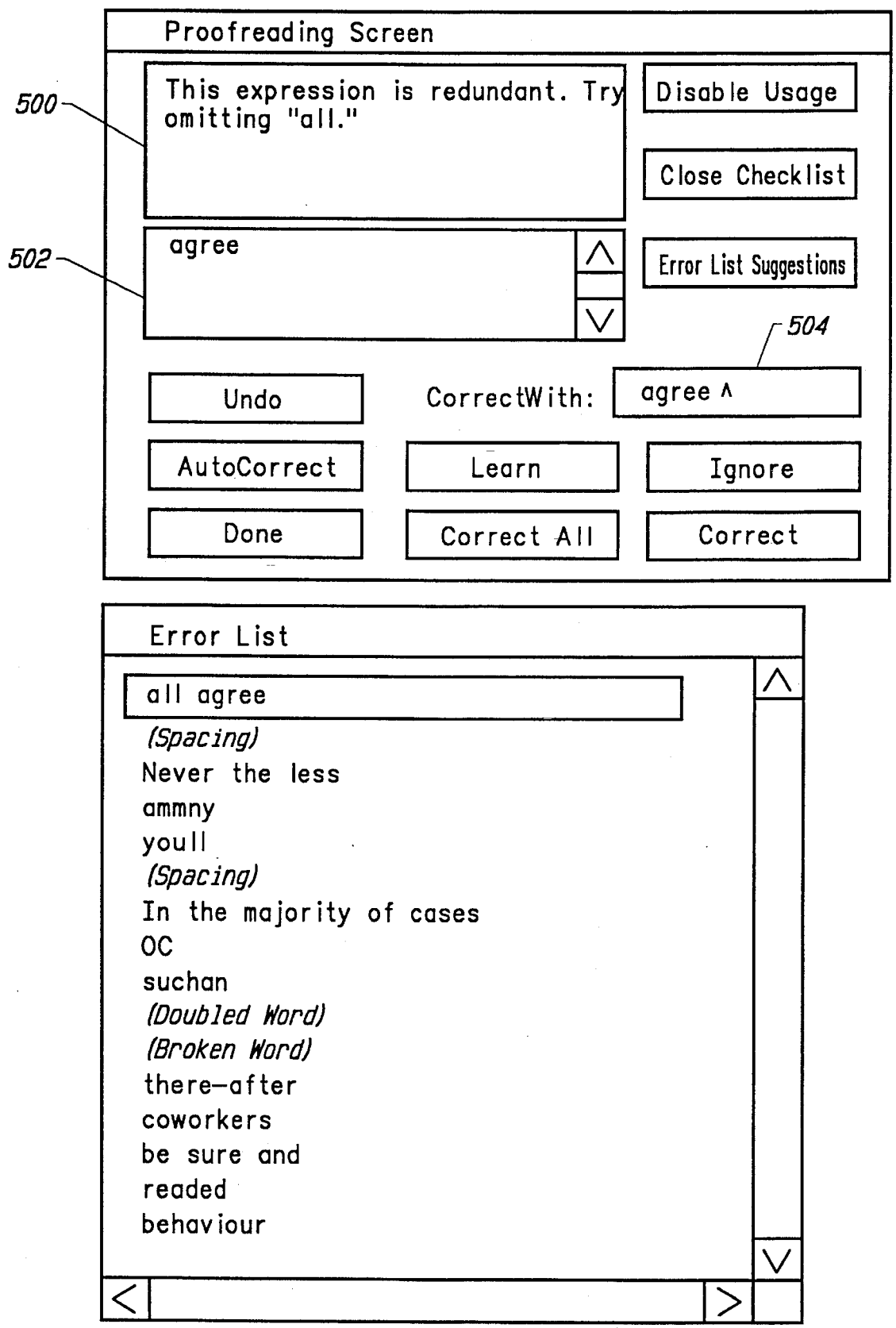
FIGS. 8 (8A and 8B) illustrates an Error List without suggested alternatives.

The Error List can be displayed with or without an alternative correction suggestion. While FIG. 5 illustrates an Error List with suggested alternatives, FIG. 8 illustrates an Error List without suggested alternatives. As such, the present invention provides the ability to toggle between an Error List containing suggestion alternatives and an Error List without suggestion alternatives. The box labeled Error-List Suggestions in FIG. 8 becomes Hide Suggestions when suggestions are included in the Error List as shown in FIG. 5. Mechanical errors are designated by a descriptive phrase to indicate the type of error enclosed in brackets. The "{Spacing}," "{Doubled Word}," and "{Broken Word}" are examples of mechanical error entries in the Error List.

Proofreading Exercise

Referring to FIG. 2, "Perform proofreading functions on scanned Document" 400 communicates the errors and provides proofreading functions to correct the errors. In the preferred embodiment, error communication and correction are facilitated by the use of three windows or display boxes: a Text Window containing the scanned text document, a proofreading screen containing proofreading functions, and an Error List window. FIG. 5 provides an example of these three windows.

The Text Window contains a copy of the text being proofread. The current error is located in the text and highlighted. The current error is either the first potential error detected during the scanning process, or the most-recently selected error. Referring to FIG. 5, "all agree" is the current error, and is highlighted in Text Window with a shaded box. The present invention may be implemented using any form of highlighting technique. Other highlighting techniques includes boldface, italics, reverse-video.

The Proofreading Screen includes informational boxes and the proofreading functions. FIG. 5 illustrates a Proofreading Screen in the preferred embodiment. The Message Window 500 provides a descriptive message to further explain the nature of the current error. Suggestions 502 are provided in the box below the Message Window. CorrectWith text 504 indicates the most-likely correction or the last suggestion entered by the user. The Proofreading Screen further provides the following proofreading functions: Correct, Ignore, Learn, Undo, AutoCorrect, Disable, Done, ErrorList, and ErrorList Suggestions/Hide Suggestions.

The Correct function corrects the current error in the current context only. Correct All corrects all occurrences of the current error in the scanned text. Ignore discards all occurrences of the current error and the current error is not included as a potential error for the current session (i.e., the current editing session). One occurrence of the current error can be ignored by selecting the next error.

Learn adds the current word to the proofreading dictionary. Once a word or phrase is learned, the present invention does not identify it as an error in any subsequent proofreading exercises. Undo cancels the last action. AutoCorrect automatically replaces a word or phrase with another word or phrase. The replacement word or phrase is either the suggestion alternative provided by the proofreading process, or by word or phrase entered in the CorrectWith field.

Disable provides the ability to disable an error category such as Usage and Spelling. The Disable command may be used to disable an error type at scan time, or when errors are being viewed in the Error List. The current error's error type is designated as the type of error to be disabled when the Disable button is selected. Disabling an error type prior to scanning a document excludes any error checking for that type of error when the text is scanned. The Disable command can further be used to eliminate scanned error types from the Error List. The current error's error type is designated as the type of error to be excluded from the Error List. Selecting the Undo command after a Disable command is performed on the Error List causes the disabled error type to be reinstated in the Error List.

Done ends the proofreading session. The ErrorList button opens the Error List window. ErrorList Suggestions provides the ability to toggle back between an Error List containing suggestion alternatives, and an Error List without suggestion alternatives.

Errors can be corrected conventionally by sequentially perusing the scanned text and using the Proofreading Screen. Further, the present invention provides the Error List as an intuitive interface for error correction. Errors can be viewed as a list, and can be corrected in any order. Errors can be grouped, and proofreading functions can be applied to all of the grouped errors. Therefore, errors can be corrected in any desired order. Further, errors can be handled collectively thereby reducing the amount of time it takes for error correction.

The Error List is opened when the ErrorList button is chosen from the Proofreading Screen (i.e., ErrorList in FIG. 5). When an error is selected in the Error List, the error is located in the scanned text. The text window scrolls to error within the scanned text.

FIG. 5 illustrates the condition of Text Window, Proofreading Screen, and Error List at the inception of the proofreading exercise. The current error in the Error List (i.e., "all agree") is highlighted with a shaded box. The current error is also highlighted in Text Window. Thus, the user may view the error in the conventional manner used in prior art systems and in the Error List in the present invention. In Proofreading Screen, Message Window 500 contains a description of the current error and Suggestions 502 provides a correction suggestion. The CorrectWith text 504 indicates the replacement text that will replace the "all agree" error, when the Correct or Correct All function is invoked.

Figures 2, 6A:
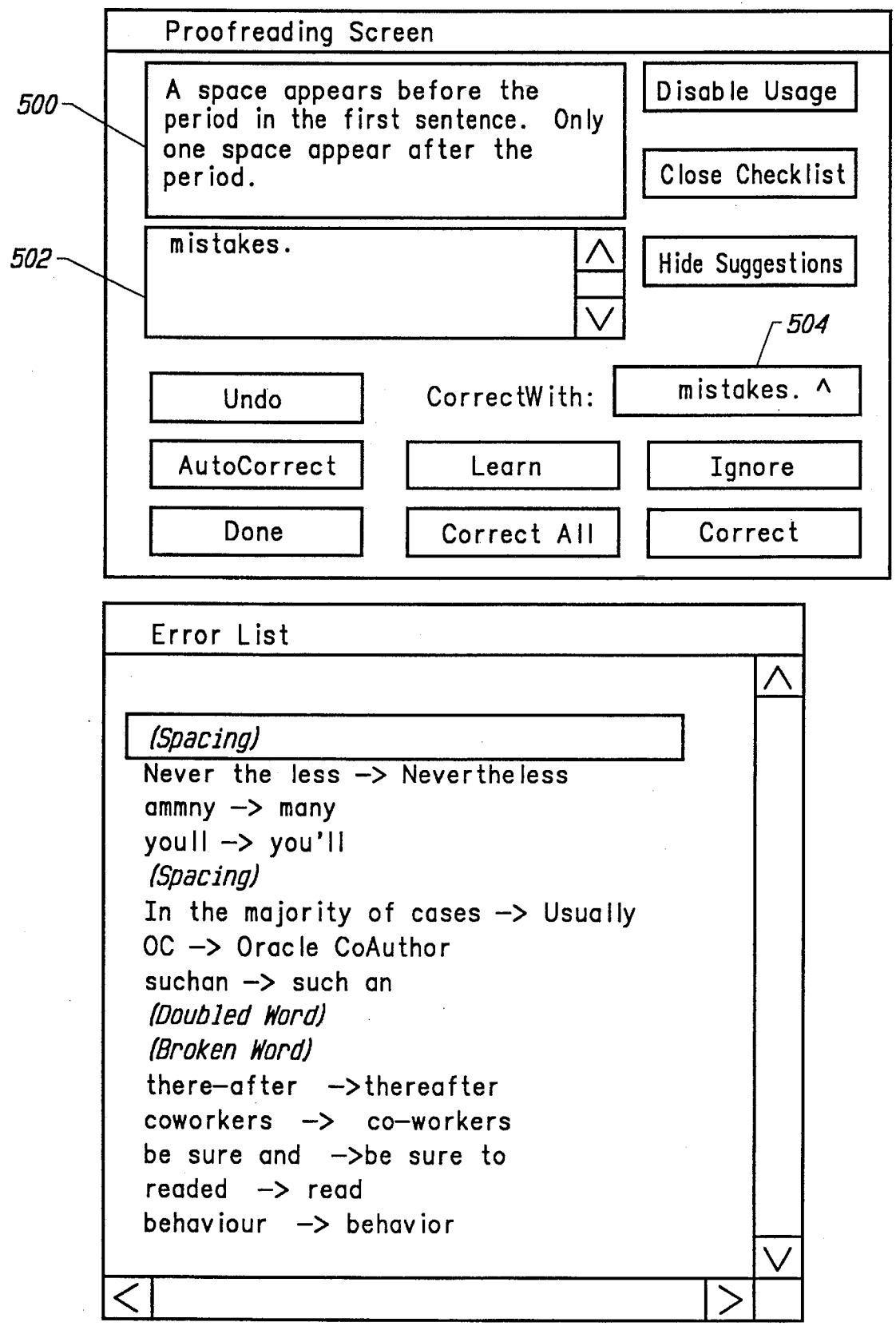
FIGS. 6A (6A-1 and 6A-2) illustrates a proofreading display after an error correction.

FIG. 6A illustrates the condition of the screen is the Correct function is selected to correct "all agree" with "agree." In Text Window, the phrase "all agree" is replaced with "agree." "All agree" is removed from the Error List. The next error in the Error List (i.e., "{Spacing}") is highlighted in the Error List. The spacing error associated with the Error List entry is located in the text in Text Window, and the associated text (i.e., "mistakes.") is highlighted in Text Window. Proofreading Screen is updated to reflect the most-recent current error. Message Window 500 contains descriptive information about the current error, Suggestions 502 contains correction suggestions, and CorrectWith text 504 contains the most-likely suggestion alternative (i.e., "mistakes.").

The present invention provides the ability to group errors and to perform operations on a group of errors such as correcting all occurrences of each of the errors in the group; excluding all occurrences of each of the errors in the group as potential errors during the current session; adding each error to the dictionary.

Groups of errors may be identified using the Error List. Contiguous errors and non-contiguous errors can be grouped together. The Correct, Ignore, and Learn functions may be used to operate on a group of errors selected from the Error List. A correction can be made to all of the errors included in a group. Further, group of errors can be bypassed by selecting Ignore after identifying a group of errors from the Error List and selecting a range of text in the scanned text. A group of errors can be added to the dictionary after identifying a group of errors.

Errors may also be selected or grouped by selecting a portion of text in the Text Window. The desired portion of the scanned text is highlighted in the text window. The errors in the highlighted section of the text will be highlighted in the Error List. The Correct, Ignore, and Learn proofreading functions can be used on any or all of the highlighted errors.

Figures 2, 6B:
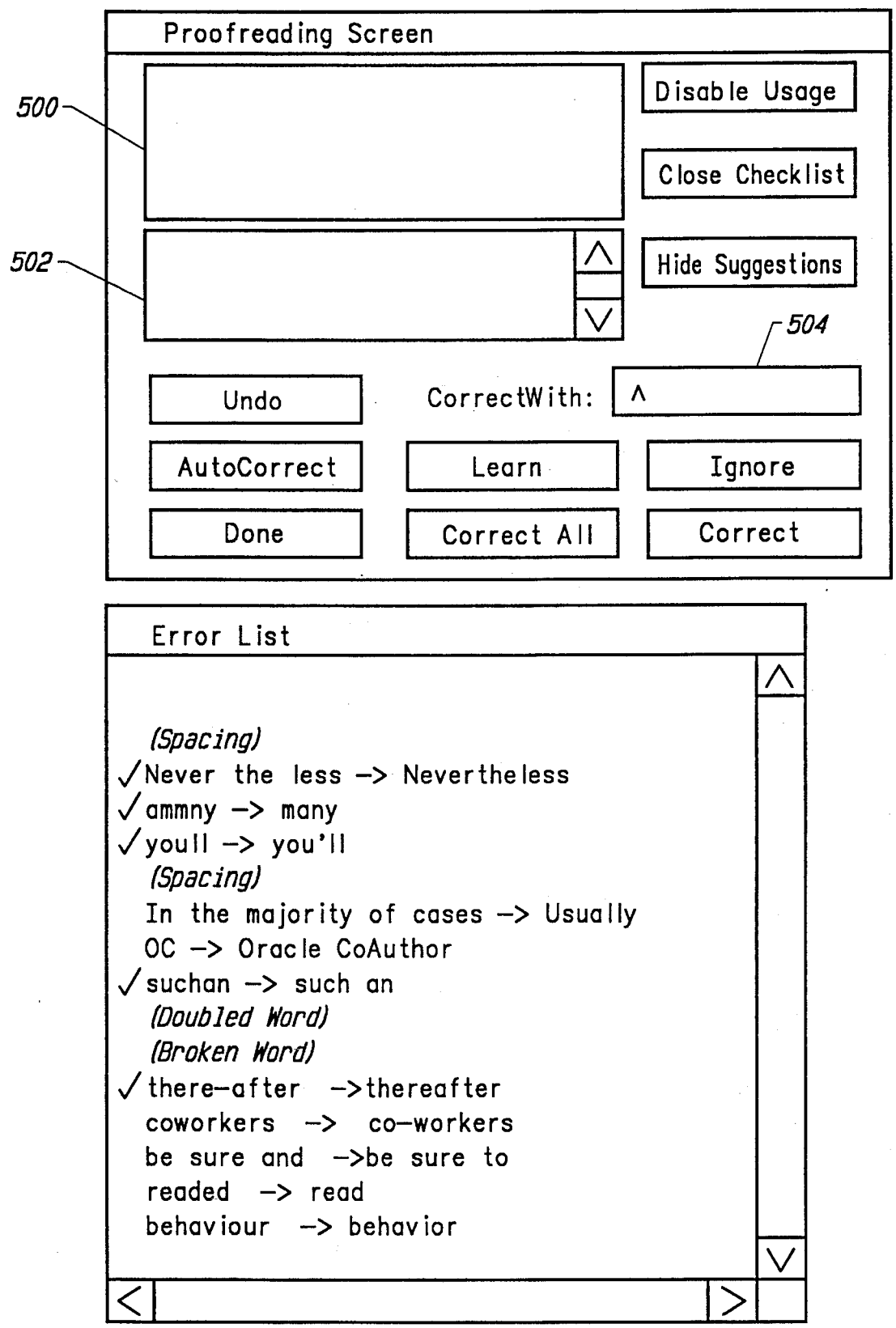
FIGS. 6B (6B-1 and 6B-2) illustrates an error group in a proofreading display.

The present invention further provides the ability to address the errors in any order. The errors in the Error List can be addressed in any order, and the Error List can be perused multiple times to including additional errors in a group before performing an operation. FIG. 6B illustrates the condition of the screen, if the spacing error is bypassed to address a group of errors with acceptable correction suggestions.

Figures 2, 6C:
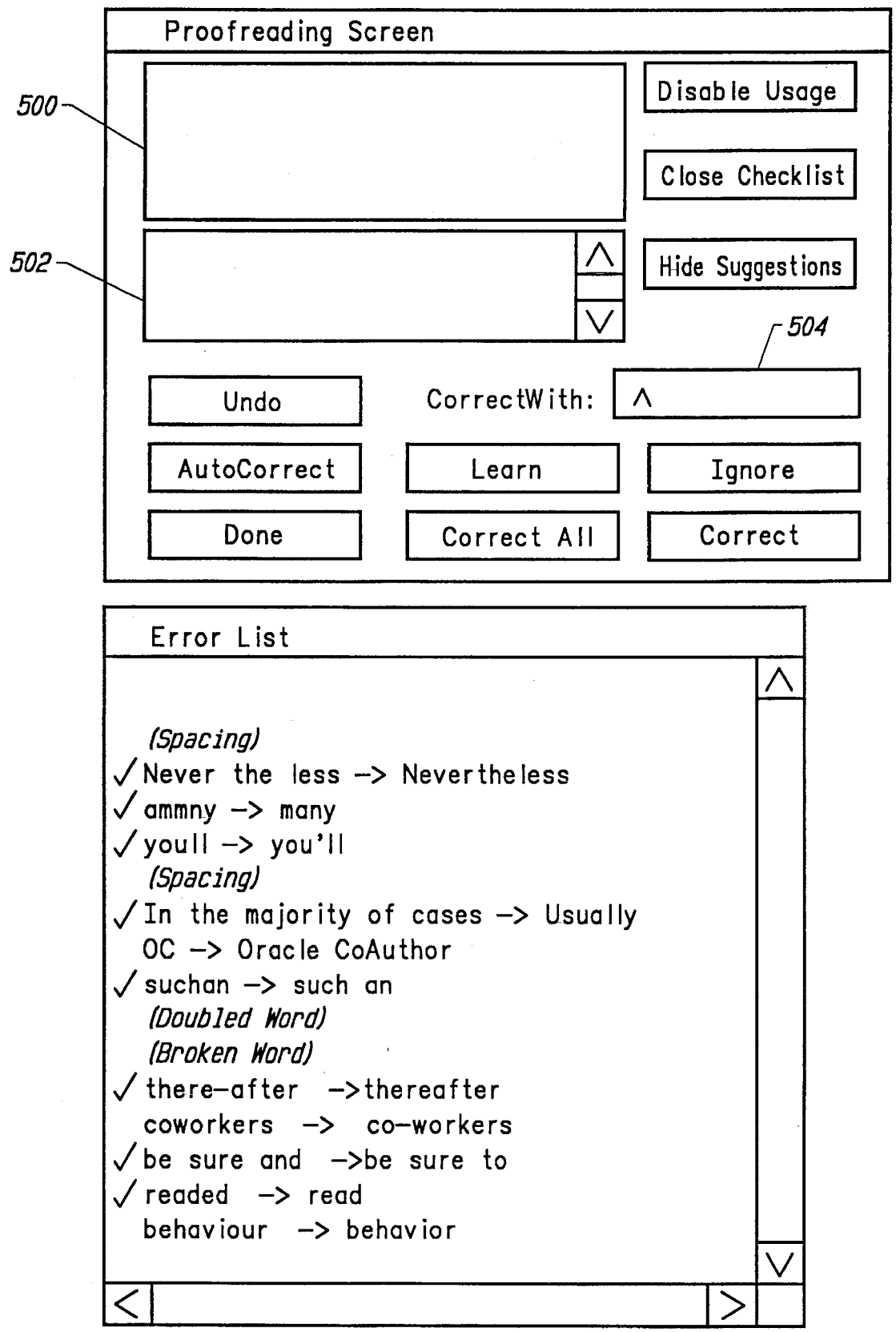
FIGS. 6C (6C-1 and 6C-2) illustrates additions to an error group in a proofreading display.

The initial perusal of the Error List might yield a group of errors including "Never the less," "amny," "youll," "suchan," and "there-after." A check mark is placed to the left of each group member after selection. Although a check mark is used in the preferred embodiment, implementation of the present invention may successfully use any means of highlighting group members. Additional scans might result in further selecting "In the majority of cases," "be sure and," and "readed." FIG. 6C illustrates the Error List after subsequent passes of the Error List. A check mark is placed to the left of the additional group members' entries. Once all of the group members have been selected, a proofread function can be selected to address the errors in the group.

Figures 2, 7A:
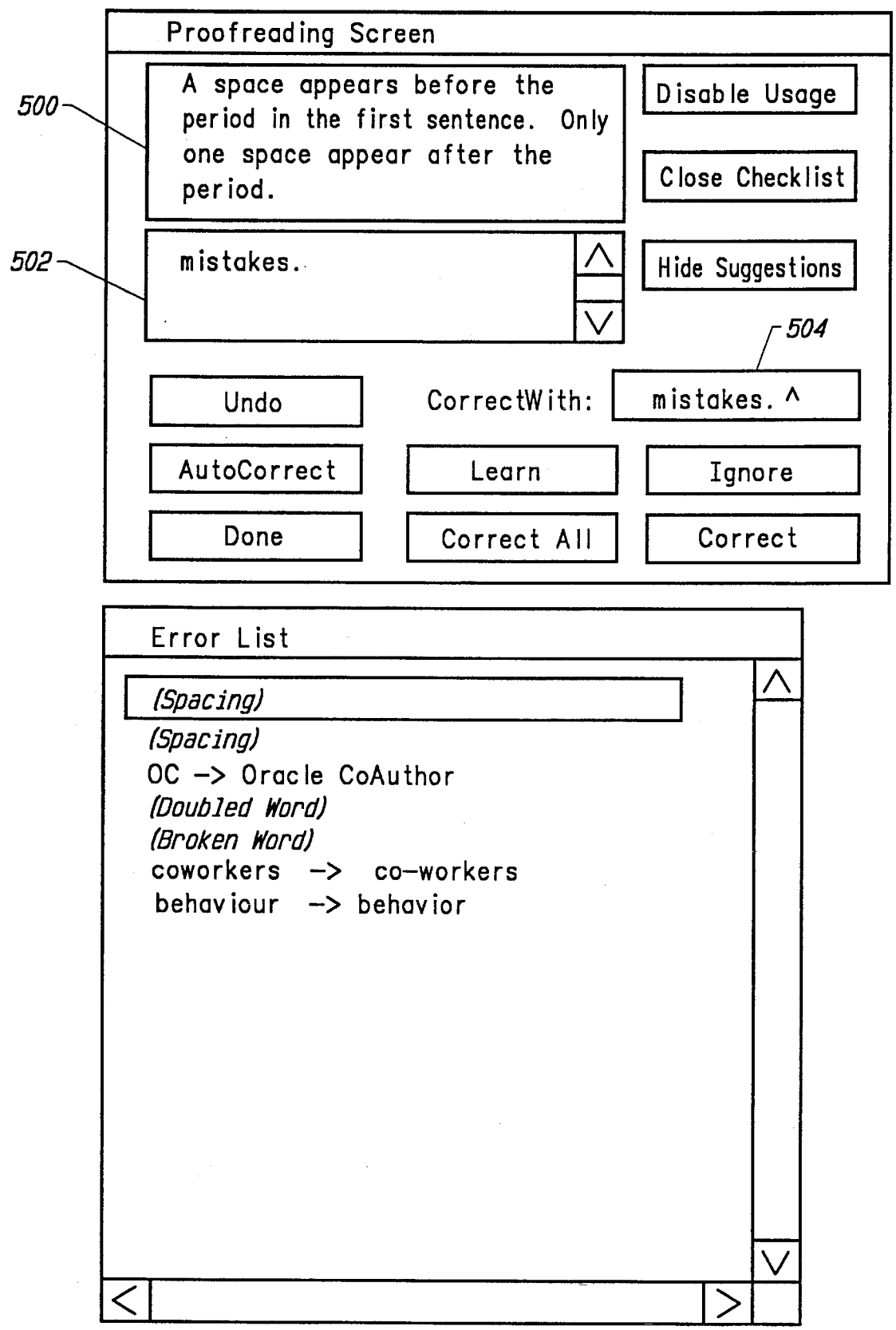
FIGS. 7A (7A-1 and 7A-2) illustrates a proofreading display after processing an error group.

FIG. 7A illustrates the condition of the screen after the Correct All function is selected and performed to address the errors in the group. All occurrences of each group member is corrected in the text and the display in Text Window. Each occurrence of a group member has the same error identifier. Thus, each occurrence of a group member can be found, and each occurrence location in the text located and modified. Further, all occurrences of each group member is eliminated from the Error List. Message Window 500, Suggestions 502, and CorrectWith 504 in Proofread Screen is updated to reflect a new current error (i.e., "{Spacing}" in the Error List and "mistakes ." in Text Window).

Figures 2, 7B:
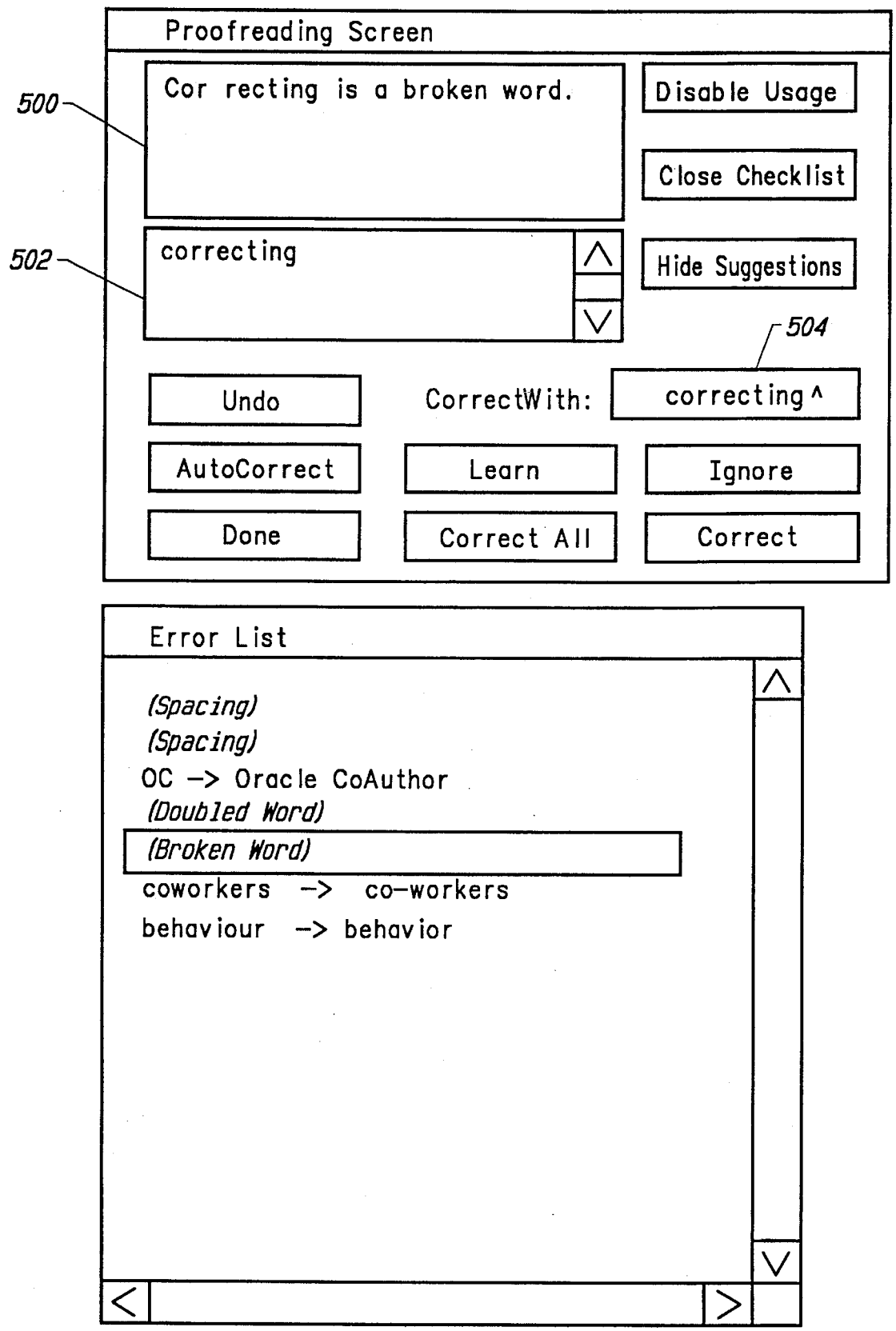
FIGS. 7B (7B-1 and 7B-2) illustrates a random-ordered selection of an error in ErrorList.

Since the present invention provides the ability to address errors in any order, the spacing error can be bypassed to select any other error in the Error List as the current error. For example, the "{Broken Word}" error can be selected instead of addressing the spacing error. Once the broken word error is selected, it becomes the current error, and the display is updated to reflect the most-recent current word. FIG. 7B illustrates the condition of the display after selecting the broken word error. The current error is located in the text and scrolled to and highlighted in Text Window. This provides the opportunity to view the current error, a mechanical error, in its context within the text. Proofreading Screen is updated with an associated message in Message Window 500, a correction suggestion for the current error in Suggestions 502, and the most-likely correction suggestion in the CorrectWith text 504. The "{Broken Word}" entry in the Error List is highlighted. The current error may be addressed, another error can be selected as the current error, or a group of errors can be selected to be manipulated by the proofreading functions.

Building ErrorList Process Flow

Figure 3:
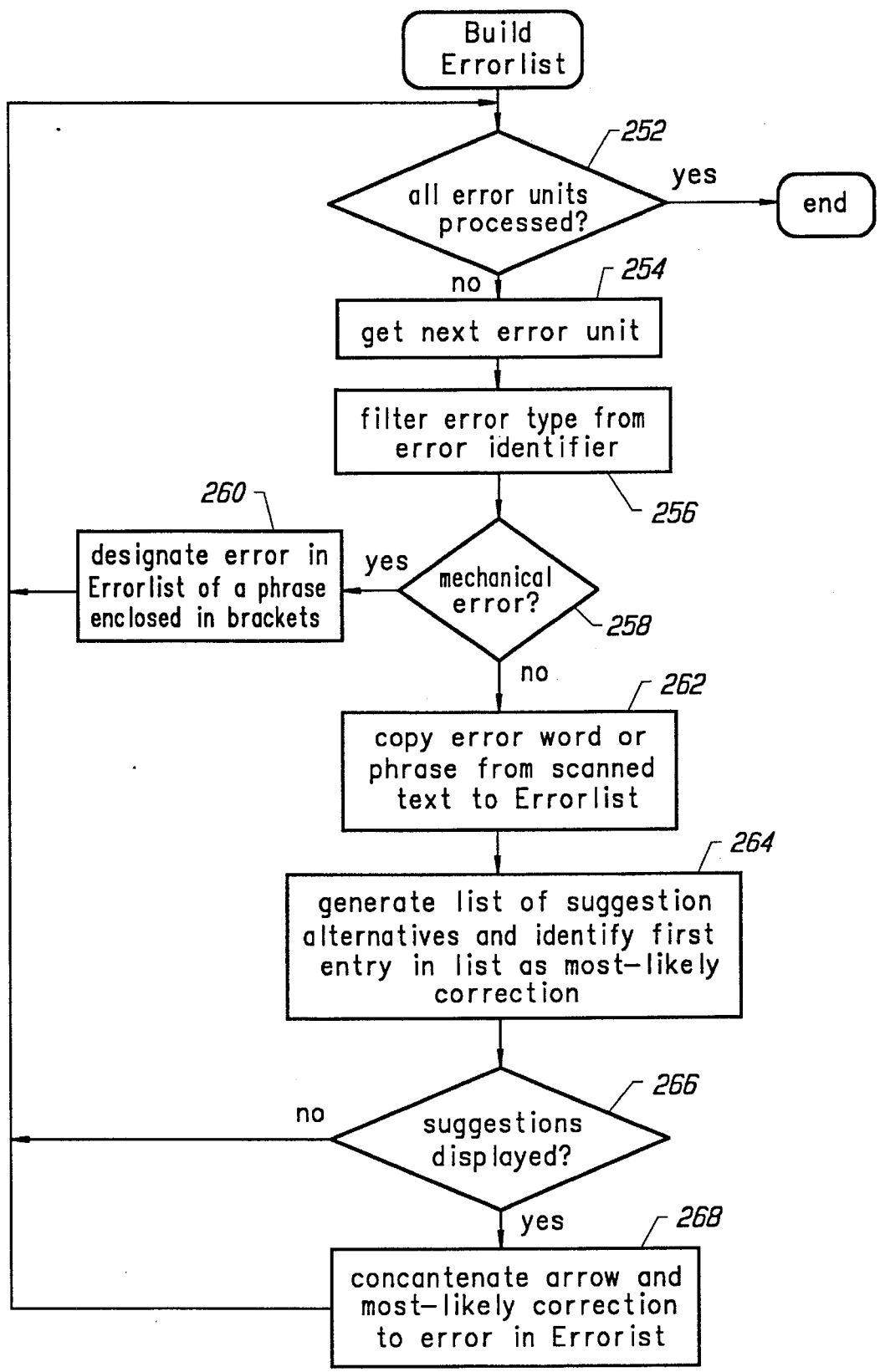
FIG. 3 illustrates the BuildErrorList process flow.

Referring to FIG. 2, once the text has been scanned and error units have been generated for the error detected during the scanning, the Error List is built. FIG. 3 illustrates the BuildErrorList process flow. At decision block 252 (i.e., "all error units processed?"), if all of the error units generated while scanning the text have been processed, processing ends. If not, the next error unit is retrieved at processing block 254.

At processing block 256, the error type is filtered from the error identifier. At decision block 258 (i.e., "mechanical error?"), the error type is examined to determine if the error is a mechanical error (i.e., a context-sensitive error). If it is a mechanical error, the phrase used to designate the error type is stored in the next position in the Error List at processing block 260, and processing continues at decision block 252 (i.e., "all error units processed?").

If the error is not a mechanical error, the error word of phrase is copied from the scanned text to the Error List at processing block 262. At processing block 264, a list of correction suggestions is generated and the first entry in the list is identified as the most-likely correction. At decision block 266 (i.e., "suggestions displayed?"), if the suggestions' toggle switch is set to hide correction suggestions, processing continues at decision block 252 (i.e., "all error units processed?").

If the suggestions' toggle switch is set to display correction suggestions, the error word or phrase in the Error List is appended with an arrow and the most-likely correction (i.e., the first correction suggestion in the list of correction suggestions for the error) at processing block 268. Processing continues at decision block 252 (i.e., "all error units processed?").

Proofreading Exercise Process Flow

Figure 4A:
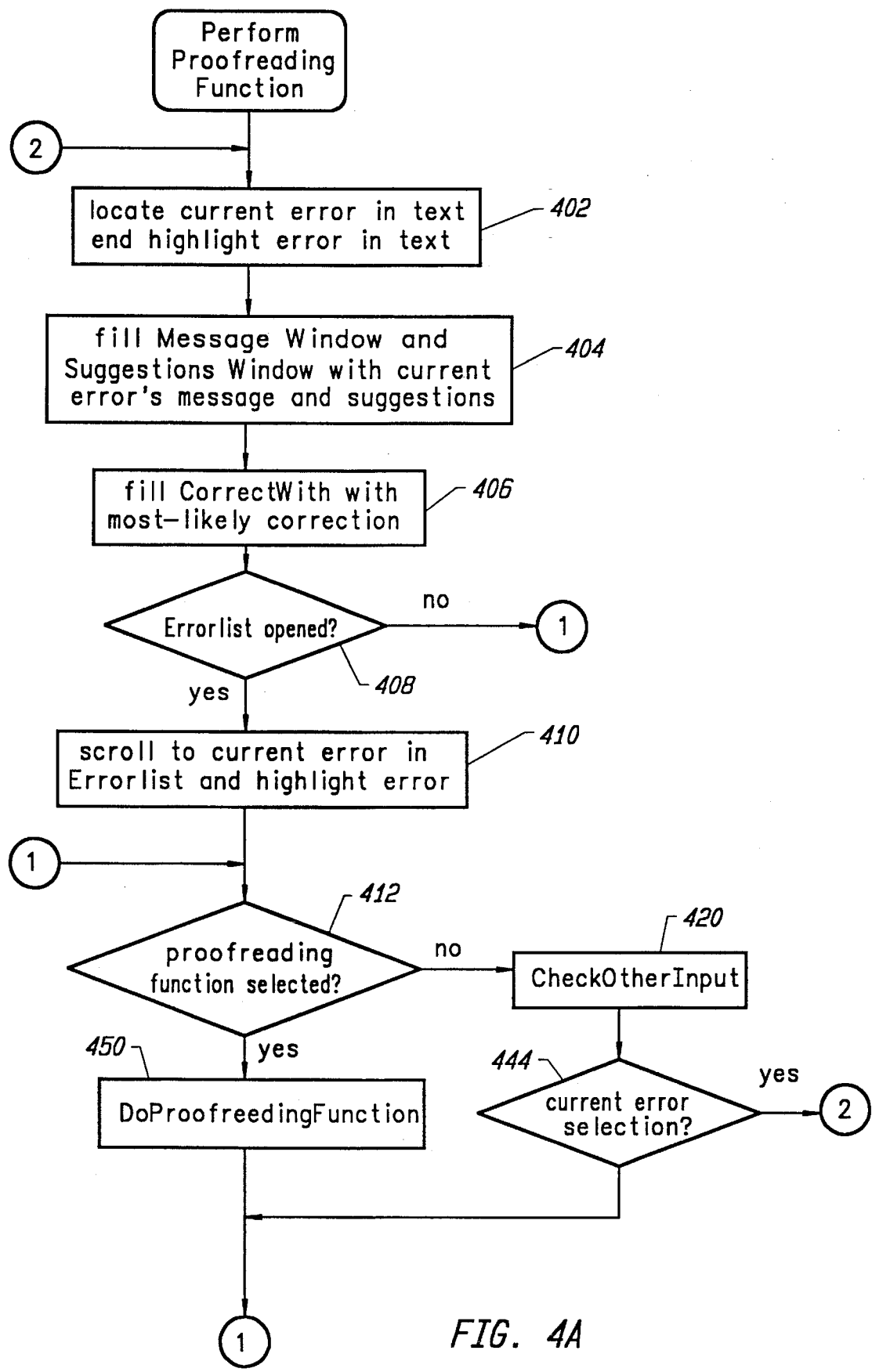
FIGS. 4A, 4B, and 4C illustrate the Perform Proofreading Functions process flow.

Referring to FIG. 2, after the Error List has been generated, the Text Window and Proofreading Screen is displayed. If ErrorList is selected, the Error List is displayed. The proofreading functions are selectable from the Proofreading Screen. FIG. 4A illustrates the proofreading process flow. At processing block 402, the current error is located and highlighted in the text in Text Window. The current error is the first error encountered in the scanning process, or the most-recently selected error.

The Message Window is filled with a descriptive message regarding the current error, and the Suggestions Window is filled with the most-likely correction at processing block 404. The most-likely correction is the first correction suggestion in the list of suggestion alternatives previously generated. CorrectWith is filled with the most-likely correction at processing block 406.

If the Error List is not opened at decision block 408 (i.e., "Error List opened?"), processing continues at decision block 412 (i.e., "proofreading function selection?"). If the Error List is opened, the current error is located in the Error List and highlighted at processing block 410.

User input may be in the form of a proofread function selection, error selection, or correction word or phrase. If the input is not a proof read function selection at decision block 412 (i.e., "proofreading function selected?"), CheckOtherInput is invoked at processing block 420. If a determination is made that a new error has been selected as the current error at decision block 444 (i.e., "current error selection?"), processing continues at processing block 402. Otherwise, processing continues at decision block 412 (i.e., "proofreading function selected?").

If the input is a proofreading function at decision block 412 (i.e., "proofreading function selected?"), DoProofreadingFunction is invoked at block 450, and processing continues at decision block 412 (i.e., "proofreading function selection?").

Figure 4B:
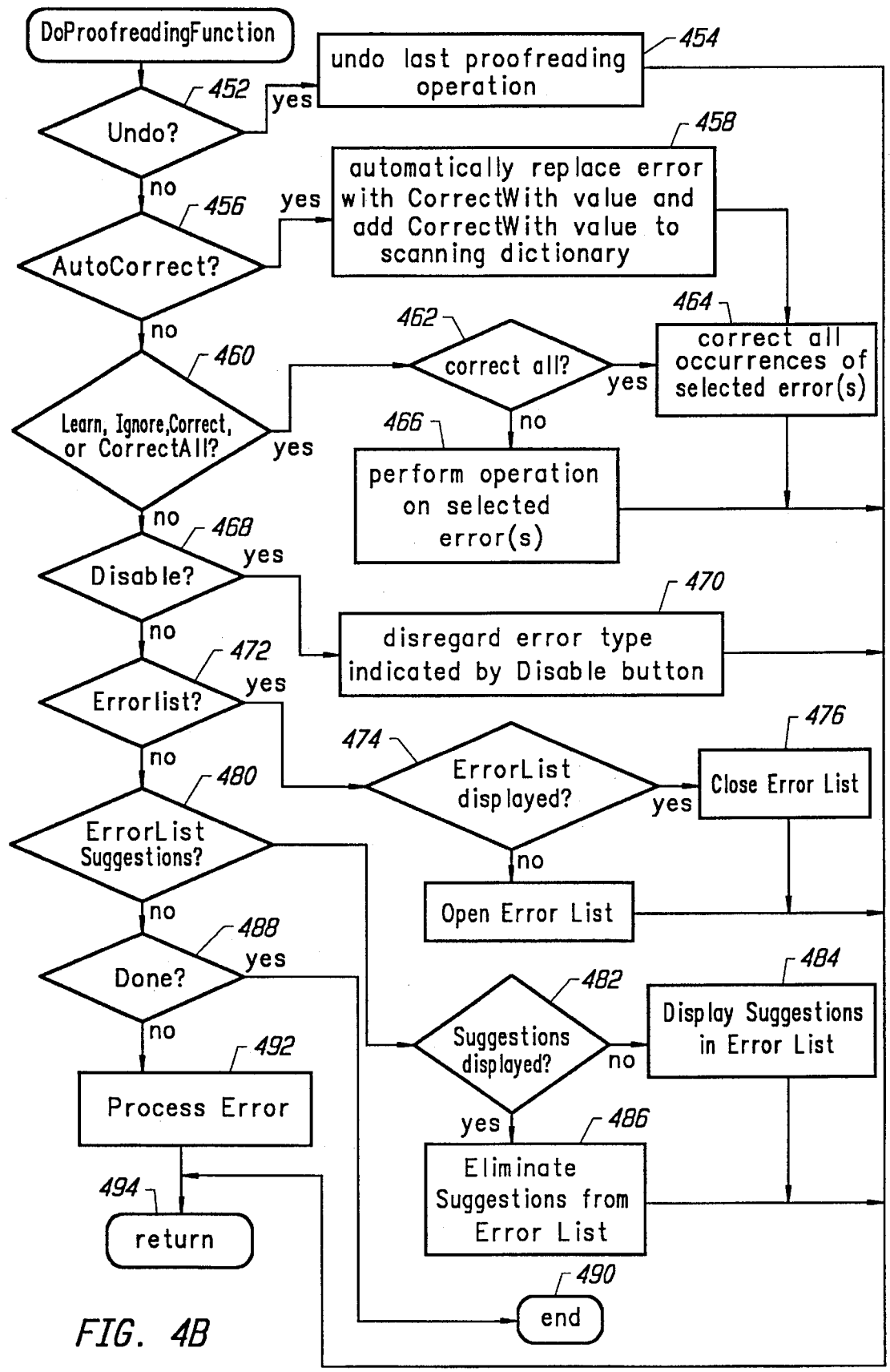

FIG. 4B illustrates the flow of DoProofreadingFunction invoked in the PerformProofreadingFunction flow. If an Undo operation is identified at decision block 452 (i.e., "Undo?"), the last proofreading operation is undone at processing block 454 and processing continues at return block 494. If an Undo operation is not identified at decision block 452, processing continues at decision block 456 (i.e., "AutoCorrect?").

If an AutoCorrect operation is identified at decision block 456, the error is replaced with the CorrectWith value at processing block 458. Further, the auto correction value is stored in the scan dictionary at processing block 458. At processing block 464, all occurrences of the selected error(s) are corrected, and processing continues at return block 494. If an AutoCorrect operation is not identified at decision block 456, processing continues at decision block 460 ("Learn, Ignore, Correct, or CorrectAll?").

If a Learn, Ignore, Correct, or CorrectAll operation is identified at decision block 460, a determination is made whether the operation is a CorrectAll operation at decision block 462 (i.e., "correct all?"). If it is not a CorrectAll operation, the selected proofreading function operation is performed on a selected error or group of errors at processing block 466. If it is a CorrectAll operation, all occurrences of the selected error or errors are corrected at processing block 464. In both cases, processing continues at return block 494. If a Learn, Ignore, Correct, or CorrectAll operation is not identified at decision block 460, processing continues at decision block 468 ("Disable?").

If a Disable operation is identified at decision block 468, the error type indicated by the Disable button (i.e., the current error type) is disregarded at processing block 470. A Disable operation will result in the error type being excluded from the scan process, and excluded from the Error List. After excluding the current error type, processing continues at return block 494. If a Disable operation is not identified at decision block 468, processing continues at decision block 472 ("ErrorList?").

If an ErrorList operation is identified at decision block 472, a determination is made whether the Error List is displayed at decision block 474 (i.e., "ErrorList displayed?"). If it is not displayed, the Error List is displayed at processing block 478. If it is displayed, the Error List is closed (i.e., removed from the display) at processing block 476. In both cases, processing continues at return block 494. If an ErrorList operation is not identified at decision block 460, processing continues at decision block 480 ("ErrorList Suggestions?").

If an ErrorListSuggestions operation is identified at decision block 480, a determination is made whether suggestions are displayed in the Error List at decision block 482 (i.e., "ErrorList Suggestions?"). If suggestions are not displayed, suggestions are added to the Error List at processing block 484. If suggestions are displayed, suggestions are removed from the Error List at processing block 486. In both cases, processing continues at return block 494. If an ErrorListSuggestions operation is not identified at decision block 480, processing continues at decision block 488 ("Done?").

If a Done operation is identified at decision block 488, the proofreading session is terminated at block 490. If a Done operation is not identified at decision block 488, invalid input may have been received. Communication of and recovery from this error state is performed at processing block 492. Processing continues at return block 494.

At return block 494, processing returns to decision block 412 (i.e., "proofreading function selected?") in PerformProofreadingFunction.

Figure 4C:
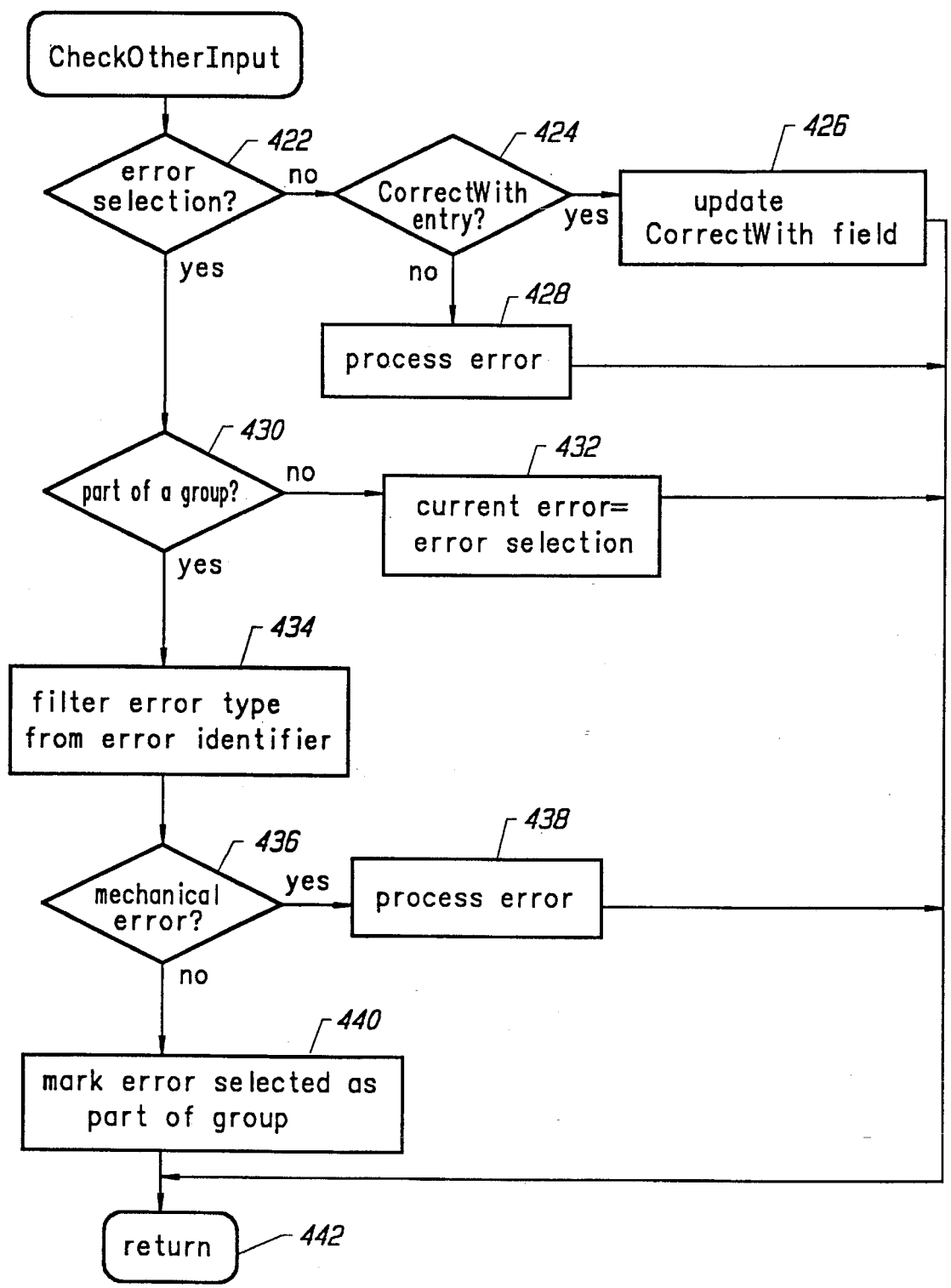

As previously described, if a proofreading function is not identified at decision block 412 in PerformProofreadingFunction, CheckOtherInput is invoked at processing block 420 of PerformProofreadingFunction. FIG. 4C illustrates the process flow of CheckOtherInput. Errors may be selected in the Text Window (i.e., by highlighting a portion of the text), or in the Error List. If the input is not an error selection at decision block 422 (i.e., "error selection?"), an inquiry is made at decision block 424 (i.e., "CorrectWith entry?") to determine whether the input is a CorrectWith field entry. If it is not, invalid input may have been received. Communication of and recovery from this error state is performed at processing block 428, and processing continues at return block 442. If CorrectWith input is identified at decision block 424, the CorrectWith field is updated at processing block 426, and processing continues at return block 442. If an error selection is identified at decision block 422 (i.e., "error selection?"), processing continues at decision block 430 (i.e., "part of a group?"). If the error selection is not part of a group of errors, the current error is set to the error selection at processing block 432, and processing continues at return block 442.

If the error selection is identified as part of a group at decision block 430, the error type is filtered from the error identifier at processing block 434. At decision block 436 (i.e., "mechanical error?"), if the error is a context-sensitive error, an error is generated as shown in block 438, and processing continues at return block 442. If the error is not a context-sensitive error, the error is marked as part of the group at processing block 440, and processing continues at return block 442.

At return block 442, processing returns to decision block 412 (i.e., "proofreading function selected?") in PerformProofreadingFunction.

The present invention provides an intuitive interface for correcting errors generated during a proofreading exercise. Errors are enumerated in the Error List thereby allowing error to be addressed in any order, or in groups. Errors can be excluded from the Error List, and errors within a subset of the text can be highlighted for easy identification and handling.

We claim:

1. A computer implemented method of proofreading a scanned document in a computer system comprising the steps of:

generating a list of errors representing a plurality of errors detected in said scanned document;

displaying simultaneously in separate display windows on said computer system said scanned document, said list of errors, and a proofreading screen containing proofreading functions;

designating a first predetermined error in said list of errors within a first display window as a current error;

locating and displaying said current error in said scanned document displayed in a second display window;

optionally designating a second predetermined error in said list of errors within said first display window, said first and second predetermined errors establishing a group of errors when more than one entry in said list of errors within said first display window is designated;

performing a proofreading function on said computer system on said current error when a proofreading function is selected for said first predetermined error; and performing a proofreading function on said computer system on said group of errors when said proofreading function is selected for said group of errors.

2. The method of claim 1 wherein a predetermined proofreading function corresponding to a predetermined error type can be disabled, said method further including the steps of providing for the selective disabling of said predetermined proofreading function, and eliminating from the display of said list of errors one or more entries in said list of errors corresponding to said predetermined error type.

3. The method of claim 2 wherein an undo proofreading function is included in said proofreading screen, said method further including the steps of providing for the enabling of said predetermined proofreading function when said undo proofreading function is selected after said predetermined proofreading function has been disabled, and restoring to the display of said list of errors one or more entries in said list of errors corresponding to said predetermined error type.

4. The method of claim 1 wherein a close list proofreading function is included in said proofreading screen, said method further including the steps of providing for the selection of said close list proofreading function, and removing from display said list of errors when said list of errors is displayed and said close list proofreading function is selected.

5. The method of claim 1 wherein an open list proofreading function is included in said proofreading screen, said method further including the steps of selectively providing for the display of said list of errors when said list of errors is not displayed and said open list proofreading function is selected.

6. The method of claim 1 wherein a suggestion proofreading function is included in said proofreading screen, said method further including the steps of developing a respective correction selection for each entry in said list of errors corresponding to a predetermined error type, and respectively displaying said correction selections for said entries in said list of errors corresponding to said predetermined error type in response to the selection of said suggestion proofreading function when said correction suggestions for entries in said list of errors are not displayed.

7. The method of claim 6 wherein a hide suggestion proofreading function is included in said proofreading screen, said method further including the step of providing for the exclusion of a correction suggestion for a selected entry in said list of errors upon selection of said hide suggestion proofreading function when said correction suggestions for said list of errors are displayed.

8. A computer implemented method of automatically correcting errors in a scanned document in a computer system comprising the steps of:

generating a list of errors detected in said scanned document;

selecting in said computer system an error from said list of errors;

identifying in said computer system an automatic correction replacement for said error;

storing in said computer system said automatic correction replacement with respect to said errors displaying said list of errors and displaying a portion of said scanned document, the display of said list of errors being separate from the display of said portion of said scanned document, the display of said list of errors including the display of said error in correspondence with said automatic correction replacement; and providing for the unordered selection of a group of one or more errors, including said error, from said list of errors for automatic correction, wherein said error is corrected using said automatic correction replacement.

9. The method of claim 8 including the step of correcting in said computer system all occurrences of said error with said automatic correction replacement.

10. A computer implemented method of presenting an operative user interface for the identification and correction of different contextual and non-contextual types of errors detected by the processing of a document within a computer system, said method comprising the steps of:

a) scanning a predetermined document, including identifying within said predetermined document the occurrence, location and a characteristic of each of a plurality of errors;

b) creating a list of error entries, each said error entry representing a set of one or more of said identified errors having a common characteristic, said list including contextual and non-contextual types of said error entries;

c) automatically creating a list of zero or more correction replacements for said non-contextual error entries;

d) displaying said list of error entries in a first user interface window separate from a second user interface window displaying said predetermined document;

e) providing for the unordered selection within said first user interface window of a predetermined one of said non-contextual type of said error entries for correction; and f) correcting, by replacement with a predetermined correction replacement from said list of correction replacements, each occurrence within said predetermined document of said identified errors represented by said predetermined one of said non-contextual type of said error entries.

11. The computer implemented method of claim 10 further comprising the steps of displaying a respective preferred correction replacement for each of said non-contextual type of said error entries, and providing for the unordered selection within said first user interface window of a plurality of said error entries for correction.

12. The computer implemented method of claim 11 further comprising the steps of sequentially displaying portions of said predetermined document showing respective occurrences of identified errors corresponding to a predetermined error entry of said contextual type, and displaying a representative portion of said predetermined document showing an occurrence of identified errors corresponding to a second predetermined error entry of said non-contextual type.

* * * * *